United States Patent
Espin et al.

(10) Patent No.: US 6,579,572 B2
(45) Date of Patent: Jun. 17, 2003

(54) WATER-BASED SYSTEM FOR ALTERING WETTABILITY OF POROUS MEDIA

(75) Inventors: Douglas Espin, Caracas (VE); Aaron Ranson, Miranda (VE); Juan Carlos Chavez, Sienna (VE); Mariela Araujo, San Antonio de los Altos (VE); Yani Carolina Araujo, San Diego de los Altos (VE); Luis Carlos Genolet, Los Teques (VE)

(73) Assignee: Intevep, S.A., Caracas (VE)

(*) Notice: Subject to any disclaimer, the term of this patent is extended or adjusted under 35 U.S.C. 154(b) by 0 days.

(21) Appl. No.: 09/928,568

(22) Filed: Aug. 13, 2001

(65) Prior Publication Data

US 2003/0031788 A1 Feb. 13, 2003

(51) Int. Cl.[7] .............................. B05D 1/18; B05D 7/22
(52) U.S. Cl. ..................................... 427/430.1; 427/230
(58) Field of Search ............................... 427/430.1, 230

(56) References Cited

U.S. PATENT DOCUMENTS

| | | | |
|---|---|---|---|
| 4,074,536 A | * | 2/1978 | Young .................... 166/295 |
| 4,532,052 A | * | 7/1985 | Weaver et al. .............. 166/275 |
| 4,842,065 A | | 6/1989 | McClure |
| 5,042,580 A | * | 8/1991 | Cullick et al. ........... 166/252.1 |
| 5,247,993 A | | 9/1993 | Sarem et al. |
| 5,644,014 A | | 7/1997 | Schmidt et al. |
| 6,186,232 B1 | * | 2/2001 | Isaacs et al. ............. 166/272.3 |
| 6,220,352 B1 | * | 4/2001 | Walton ....................... 166/263 |

FOREIGN PATENT DOCUMENTS

| | | |
|---|---|---|
| CN | 1320762 A | 11/2001 |
| GB | 2 127 462 | 9/1982 |
| GB | 2 167 468 | 5/1986 |
| WO | WO 98/22648 | 5/1998 |

* cited by examiner

Primary Examiner—Michael Barr
(74) Attorney, Agent, or Firm—Bachman & LaPointe, P.C.

(57) ABSTRACT

A method for altering wettability of a reservoir formation includes the steps of providing a water-based fluid containing a wettability altering coating system; and flowing the fluid into a reservoir so as to coat the reservoir with the coating system.

12 Claims, 1 Drawing Sheet

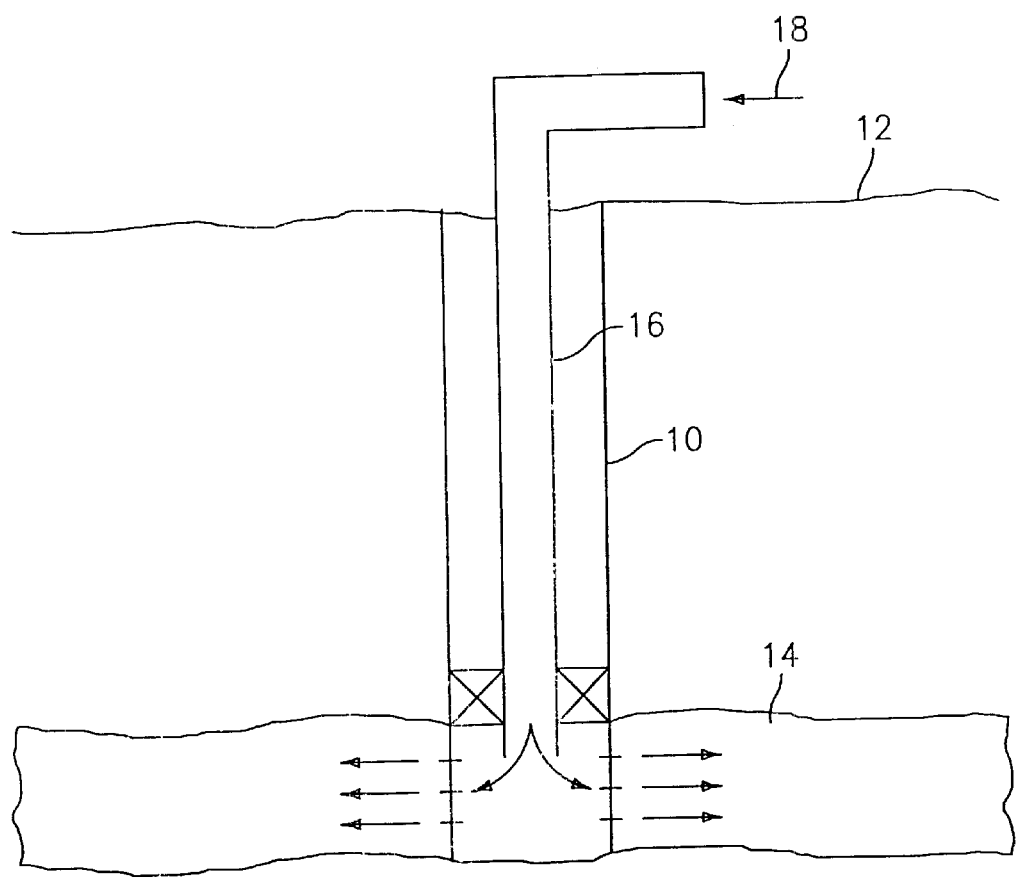

WATER-BASED SYSTEM FOR ALTERING WETTABILITY OF POROUS MEDIA

BACKGROUND OF INVENTION

The invention relates to a water-based system for altering wettability of porous media and, more particularly, to a method for using such a system to improve hydrocarbon production from subterranean porous formations.

In the production of hydrocarbons from subterranean hydrocarbon bearing formations, formation wettability is an important parameter which affects fluid flow through the reservoir. Wettability is a manifestation of rock-fluid interactions, and hydrocarbon reservoir rocks exhibit different wetting conditions. Reservoir rocks can be considered as strongly and weakly water wet, strongly and weakly oil wet, and intermediate wet. These wetting conditions are dictated by the mineral or rock surface, fluid composition, physical-chemical properties, temperature, pressure and the like.

Since wettability is an important parameter in the recovery of hydrocarbons, it is desirable to be able to alter or adjust wettability to gain additional control over the production process.

Unfortunately, conditions in subterranean formations tend to be harsh, and modification of reservoir wettability is therefore difficult.

Further, other reservoir properties such as permeability and porosity are critical to good hydrocarbon production and must be protected.

It is the primary object of the present invention to provide a method and system whereby wettability of a reservoir formation can be altered as desired.

It is a further object of the present invention to provide a method and system which are resistant to harsh reservoir conditions.

It is a still further object of the present invention to provide such a method and system which can be applied to enhance production from existing hydrocarbon-producing wells while avoiding any substantial impact upon formation porosity or permeability.

Other objects and advantages of the present invention will appear hereinbelow.

SUMMARY OF THE INVENTION

In accordance with the present invention, the foregoing objects and advantages have been readily attained.

According to the invention, a method is provided for altering wettability of a reservoir formation, which method comprises the steps of providing a water-based fluid containing a wettability altering coating system; and flowing said fluid into a reservoir so as to coat said reservoir with said coating system.

In accordance with a preferred aspect of the present invention, the fluid comprises an aqueous solution system comprising a combination of organic and inorganic components having nanoparticle size.

The organic nanoparticles are preferably polymeric structures which are adsorbed on the mineral surface leading to the formation of a film on the mineral surface so as to alter wettability as desired without substantially affecting formation permeability or porosity.

The inorganic nanoparticles are selected to help control viscosity of the fluid as desired.

In further accordance with the invention, the flowing step can preferably be accomplished by flowing the fluid into the reservoir with the fluid under pressure, and holding the pressure until the coating system has cured.

In accordance with a further aspect of the present invention, it has been found that an intermediate wetting condition is most desirable for enhancing hydrocarbon production from a reservoir. Thus, according to the invention, the method is ideally utilized with reservoirs having a wetting condition selected from the group consisting of strongly water wet and weakly oil wet, or strongly oil wet and weakly water wet, and the coating system is preferably selected so as to provide the reservoir with a desired wetting condition which may be an intermediate or some other wetting condition.

BRIEF DESCRIPTION OF THE DRAWINGS

A detailed description of preferred embodiments of the present invention follows, with reference to the attached drawing, wherein:

The FIGURE schematically illustrates a method for introducing a system according to the invention into a subterranean reservoir.

DETAILED DESCRIPTION

The present invention relates to a method and system for altering the wettability of a porous media, and more particularly, to a method for altering wettability of a subterranean hydrocarbon-bearing formation so as to enhance flow of fluid through the formation and increase production flow rate.

Wettability is an important parameter in connection with hydrocarbon fluid flow rate through subterranean porous formation. Reservoir rocks exhibit different wetting conditions with various types of hydrocarbon and water solutions contained therein.

Reservoir wettability is conventionally measured by the Amott-Harvey method, which consists of four spontaneous and forced displacements of water and oil through a porous sample. Two indexes are defined, the oil wetting index $T_o$ and the water wetting index $T_w$, they are combined to give the total wettability index $T=T_w-T_o$. When $0.3<T<1$, the sample is water wet, for $-0.3<T<0.3$, the sample is intermediate wet and when $-1<T<-0.3$, the sample is oil wet. The displacement tests are typically performed on core plugs.

Wettability estimation can also be accomplished using the rock surface composition obtained by XPS (x-ray photoelectron scattering), and correlating it with the amount of organic carbon absorbed on the surface.

While many reservoir rocks are strongly and/or weakly water wet, or strongly and/or weakly oil wet, it has been found that an intermediate wetting condition provides for enhanced hydrocarbon flow through the reservoir.

In addition, reservoirs having an initially intermediate wetting condition can have this wetting condition drastically modified due to other typical oil well actions such as water or steam injection, fracturing, and numerous other typical actions which can be taken on hydrocarbon producing wells and reservoirs.

In accordance with the present invention, the desired wettability is obtained utilizing a water-based fluid containing a wettability altering coating system, and the water-based fluid is disposed into the reservoir by flowing the fluid into the reservoir, preferably under pressure, so as to treat a section of the reservoir around the well, thereby altering wettability as desired and enhancing hydrocarbon flow through this section.

In accordance with the present invention, the water-based fluid is preferably an aqueous system containing a combination of organic and inorganic components having nanoparticle size.

Aqueous systems are ideal for use in accordance with the present invention in that they are well adapted to depositing a thin film of the desired material upon grains of the reservoir so as to modify or alter the wettability to the desired range without significantly impacting upon porosity or permeability.

The organic and inorganic components are preferably nanoparticle-sized structures, and can be provided using known technology, for example as disclosed in PCT/EP97/06370.

As set forth above, the nanoparticles preferably include organic and inorganic structures. Preferred organic structures include polymeric structures, for example silanes, alkoxysilanes with fluorinated chains, alkylcarbonyl and the like. These structures advantageously adsorb onto the mineral surface of grains of the reservoir so as to assist in generating the desired thin film.

The inorganic components are preferably provided so as to control density and viscosity of the fluid, that is, to provide the fluid with a viscosity that is suitable to the desired application. Examples of suitable inorganic nanoparticles include silicon, aluminum, titanium, zirconium and the like, and combinations thereof.

The water-based fluid system in accordance with the present invention is particularly effective at altering the wettability condition of subterranean reservoirs without substantially reducing reservoir permeability or porosity because the coating system is delivered through nanoparticles carried by the water-based fluid and forms a very thin film around grains of the formation. Nanoparticles for use in the fluid preferably have an average particle size of between about 1 nm and about 200 nm, which combine to provide for a versatile system that can be adapted to obtain the desired wetting condition from an existing wetting condition, which is also resistant to the harsh conditions experienced in downhole reservoirs. Within this range, for the organic particles, when silanes are used the particle size is advantageously less than about 200 nm. When alkoxysilanes are used the particle size is preferably less than about 100 nm, and when alkylcarbonyl is used, the particle size is preferably less than about 50 nm.

Because the system is a water-based fluid, the fluid can be pumped through existing wells into the formation utilizing existing equipment and fluid injection techniques.

Turning to FIG. 1, a schematic example of one embodiment of the present invention is provided.

The FIGURE shows a well 10 drilled from surface 12 to a subterranean formation 14. Subterranean formation 14 contains hydrocarbons which are to be produced to surface 12 through well 10.

As shown, well 10 typically includes a production string 16 through which fluids can be conveyed to and produced from reservoir 14.

According to the invention, a suitable fluid 18 is prepared in accordance with the invention. Fluid 18 is, as described above, a water-based fluid containing a wettability altering coating system which is preferably an aqueous system containing organic and inorganic nanoparticles which advantageously serve to adhere to the reservoir or formation by forming a thin film around grains of the formation so as to change wettability without substantially changing porosity or permeability.

Fluid 18 is preferably pumped through production string 16 and into reservoir 14 under pressure so as to apply the wettability altering coating system to formation 14.

In connection with a particularly preferred embodiment of the present invention, formation 14 is a quartz formation, and fluid 18 serves to alter wettability to an intermediate wetting condition whereby hydrocarbon is not trapped due to capillary pressure and/or surface tension.

Fluid 18 is preferably pumped through production string 16 and into formation 14 under pressure higher than the formation pressure, for example, for a typical reservoir, under a pressure of between about 500 psi and about 15000 psi and this pressure is preferably held for a period of between about 1 and about 12 hours so as to allow the wettability altering coating system to cure on formation 14. Different pressures and holding times can be used, however, at least about 0.2 pore volumes of fluid are preferably injected.

After sufficient curing time, the pressure is released, at which time reservoir pressure will drive fluids back toward well 10 and through production string 16 to surface 12. The initial stage of production will remove any remaining traces of fluid from reservoir 14, and the altered wettability characteristic of reservoir 14 will then advantageously lead to improved productions rates as desired.

In accordance with the present invention, it should readily be appreciated that a system and method has been provided whereby wettability of a hydrocarbon bearing formation or other porous media can be altered to a desired state, and production flow rates from the formation can be improved.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method for altering wettability of a reservoir formation, comprising the steps of:
   providing a water-based fluid containing a wettability altering coating system; and
   flowing said fluid into a reservoir so as to coat said reservoir with said coating system, wherein said coating system comprises wettability altering nanoparticles.

2. A method for altering wettability of a reservoir formation, comprising the steps of:
   providing a water-based fluid containing a wettability altering coating system; and
   flowing said fluid into a reservoir so as to coat said reservoir with said coating system, wherein said coating system comprises organic components selected from the group consisting of silanes, alkoxysilanes with fluorinated chains alkylcarbonyl and combinations thereof, wherein said silanes have a particle size of less than about 200 nm, said alkoxysilanes have a particle size of less than about 100 nm and said alkylcarbonyl has a particle size of less than about 50 nm.

3. The method according to claim 1 or 2, wherein said coating system comprises a combination of organic and inorganic components having a nanoparticle size.

4. The method according to claim 3, wherein said organic components are polymeric structures and wherein said flowing step adsorbs said polymeric structures on surfaces of said reservoir.

5. The method according to claim 4, wherein the coating system forms a film around grains of said reservoir whereby wettability of said reservoir is altered.

6. The method according to claim 1, wherein said coating system comprises organic components selected from the group consisting of silanes, alkoxysilanes with fluorinated chains, alkylcarbonyl and combinations thereof.

7. The method according to claim 1 or 2, wherein said coating system comprises inorganic components selected from the group consisting of silicon, aluminum, titanium, zirconium and combinations thereof.

8. The method according to claim 1 or 2, wherein said reservoir has a wettability index of less than about −0.3 or greater than about 0.3, and further comprising selecting said coating system so that said flowing step provide said reservoir with a wettability index of between about −0.3 and about 0.3.

9. The method according to claim 1 or 2, wherein said flowing step comprises pumping said fluid into said reservoir through a well positioned on the surface to said reservoir.

10. The method according to claim 1 or 2, wherein said flowing step comprises flooding said reservoir with said fluid under pressure, and holding said pressure until said coating system is cured.

11. The method according to claim 1 or 2, wherein said flowing step is carried out so as to penetrate said formation with at least about 0.2 pore volumes of said fluid.

12. The method according to claim 1 or 2, wherein said reservoir has a wetting condition selected from the group consisting of water wet and oil wet, and wherein said coating system coats said reservoir so as to provide said reservoir with a wetting condition.

* * * * *